(12) United States Patent
Stovold et al.

(10) Patent No.: US 10,920,081 B2
(45) Date of Patent: Feb. 16, 2021

(54) LEUCO DYE PASTEL COLORING KIT

(71) Applicant: Nocopi Technologies, Inc., King of Prussia, PA (US)

(72) Inventors: Terry W. Stovold, King of Prussia, PA (US); JoAnn Domanski, King of Prussia, PA (US)

(73) Assignee: Nocopi Technologies, Inc., King of Prussia, PA (US)

( * ) Notice: Subject to any disclaimer, the term of this patent is extended or adjusted under 35 U.S.C. 154(b) by 0 days.

(21) Appl. No.: 16/785,364

(22) Filed: Feb. 7, 2020

(65) Prior Publication Data
US 2020/0180333 A1    Jun. 11, 2020

Related U.S. Application Data

(62) Division of application No. 15/953,077, filed on Apr. 13, 2018, now Pat. No. 10,597,537.

(51) Int. Cl.
| | |
|---|---|
| *C09B 67/00* | (2006.01) |
| *C09B 67/02* | (2006.01) |
| *D06P 5/00* | (2006.01) |
| *C09D 7/63* | (2018.01) |
| *B41M 3/00* | (2006.01) |
| *C09D 5/29* | (2006.01) |

(52) U.S. Cl.
CPC ......... *C09B 67/0097* (2013.01); *B41M 3/001* (2013.01); *C09D 5/29* (2013.01); *C09D 7/63* (2018.01); *D06P 5/002* (2013.01)

(58) Field of Classification Search
CPC ............ C09B 67/0097; C09B 67/0013; C09B 67/0092; C09B 69/109; C09B 9/00; B41M 3/001
USPC ............................................................ 8/478
See application file for complete search history.

(56) References Cited

U.S. PATENT DOCUMENTS

| | | | |
|---|---|---|---|
| 6,124,377 A | 9/2000 | Kaiser et al. | |
| 2013/0178362 A1* | 7/2013 | Stovold | B41M 5/3335 503/201 |

\* cited by examiner

*Primary Examiner* — Eisa B Elhilo
(74) *Attorney, Agent, or Firm* — Weitzman Law Offices, LLC

(57) ABSTRACT

A leuco dye pastel marking device for use with a substrate treated with an activator of the leuco dye, such that drawing upon the substrate will reveal a color, but drawing on a normal surface will have no visible effect. A solvent such as dimethyl adipate is used to store the leuco dye in a longer-lived, more stable, solid form, and varying hardnesses and consistencies may be achieved by the addition of 12 hydroxystearic acid and ethyl cellulose. The substrate may be treated selectively with the activator such that a texture, image, or hidden message is revealed by the application of the leuco dye pastel to the substrate. One or more substrates and one or more leuco dye pastel marking devices may be presented to a child as a coloring book with pastels that only visibly mark the coloring book and no other surface.

15 Claims, 4 Drawing Sheets

LEUCO DYE PASTEL COLORING KIT

CROSS REFERENCE TO RELATED APPLICATION

This application is a divisional of U.S. patent application Ser. No. 15/953,077, titled "LEUCO DYE PASTEL MARKING DEVICE," filed Apr. 13, 2018, which is hereby incorporated by reference in its entirety.

FIELD OF INVENTION

The present invention relates to pastels used to dye a surface, and more specifically, to leuco dye-containing pastels that react with a treated paper or other substrate to which the pastels are applied.

BACKGROUND

In the fields of art supplies, textiles, and chemistry more generally, the principle of leuco dyes—dyes that can be induced to transition between a first, white or colorless "leuco" form and a second, colored form—are well known. Leuco dyes may be induced to transition in response to a change in temperature, exposure to ultraviolet radiation or other light, and/or exposure to a chemical, such as an acid, a base, or even oxygen in the atmosphere.

Although a leuco dye may be used in a water-based marker, such markers have the drawbacks of potentially leaking or drying out over time and becoming unusable. Further, if such a marker is used on an ordinary surface such as a sheet of paper in a notebook, reaction with ambient heat, light, or air may take a substantial period of time to trigger the visible transformation of the dye, leaving a user of the marker unsure whether the marker is working, or frustrated at the delay in the appearance of color on the page.

Additionally, water-based activators for leuco dyes are often limited in applicability due to the lower viscosity or other chemical properties of the activator. For example, a printer might be unable to print activator-based ink only on portions of a sheet of paper, and the only feasible way of adding activator might be dipping or coating the entire surface in activator.

Some existing methods of storing leuco dye or its activator in preparation for applying it to a surface involve encapsulating the leuco dye particles or activator in protective spheres such that, when the leuco dye is mechanically pressed against the activator, the spheres rupture, allowing the leuco dye and activator to mix freely, and transition to a colored form. However, encapsulation is an expensive process, and the capsules may be ruptured by rough handling either during manufacture or by the end user, ruining and losing the encapsulated dye before it gets to the activator. Thus, an encapsulating process is forced to thread a needle between being hard enough to survive a manufacturing or printing

SUMMARY

According to an embodiment of the present invention, a coloring kit is disclosed, comprising a substrate and one or more solid pastels. The substrate may comprise an activator of one or more leuco dyes, the activator being dissolved in a solvent and printed or coated on at least part of a surface of the substrate. The one or more solid pastels may comprise the one or more leuco dyes dissolved in a mixture that comprises either: a mixture of about 68-75% dimethyl adipate, 0 to about 25% dibenzylamide sorbitol, about 1-2% dibutyl ethyl hexanoyl glutamide, about 1-2% ethyl cellulose, about 0.1-0.5% pentaerythritol tetrakis (3-(3,5-di-tert-butyl-4-hydroxyphenyl)proprionate), and about 6% or less leuco dye, or a mixture of about 48-70% 12 hydroxystearic acid, about 20-45% dimethyl adipate, about 4-8% ethyl cellulose, and about 6% or less leuco dye.

DETAILED DESCRIPTION

To address the problems described above, a leuco dye pastel marking device including a solvent other than water may be used, storing a leuco dye in a solid or semi-solid mixture that is resistant to drying out, to leaking, and to mechanical damage interfering with the dye delivery.

Although throughout this specification reference is made to a solid or semisolid pastel, the principles and embodiments described herein may be applicable to wax-based crayons, chalks, gums, resins, oils, or other traditional marking media using solvents other than water to retain a dye or coloring in a solid, semisolid, or gel form.

Figure 1:
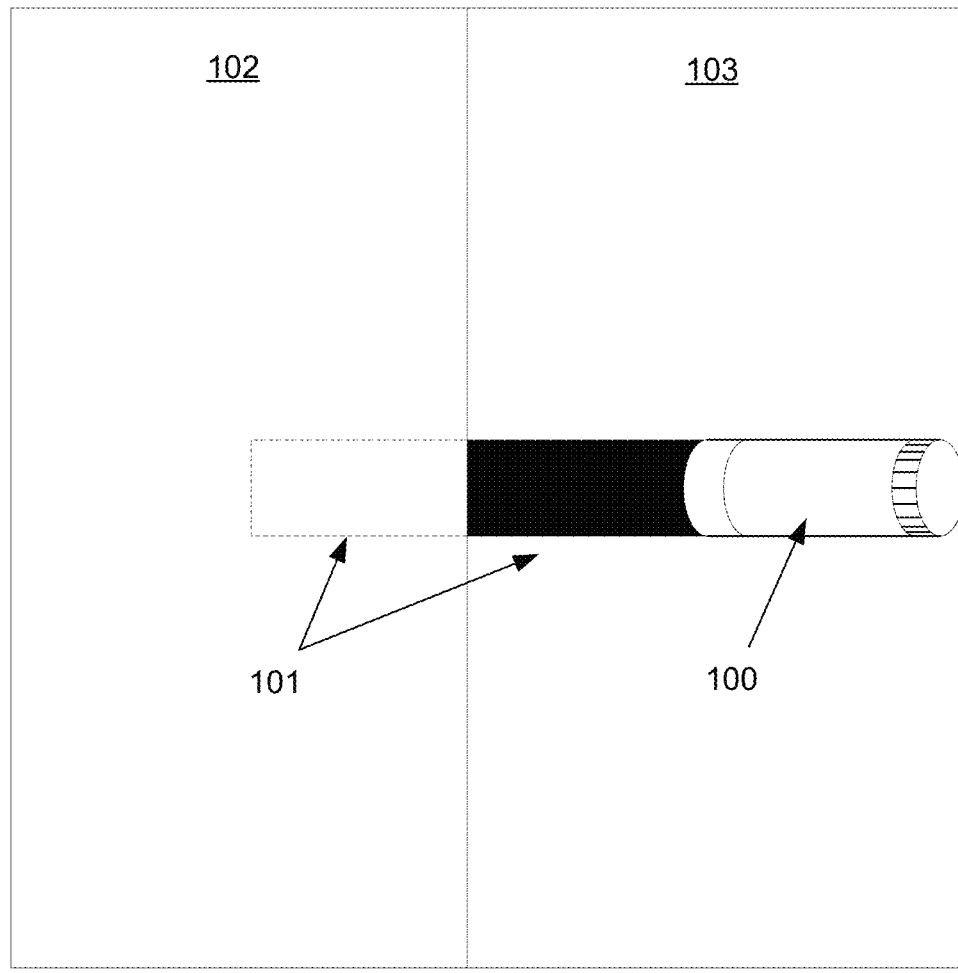
FIG. 1 illustrates, in simplified form, a leuco dye pastel being applied to both a treated and an untreated substrate.

FIG. 1 illustrates, in simplified form, a leuco dye pastel being applied to both a treated and an untreated substrate.

With reference now to FIG. 1, a leuco dye pastel marking device 100 may draw a path 101 across both an untreated substrate 102 and a treated substrate 103.

In some embodiments, substrates 102 and 103 may be paper. Treatment of the treated substrate 103 may comprise incorporating the activator into the substrate itself (e.g., incorporating an activator in the pulp that will be pressed into paper before drying), applying the activator in a swath or over the entirety of the surface of the substrate (e.g., dipping paper into an activator to absorb it, using a brush or roller to apply an activator to paper, or coating the paper with an activator), or printing the activator on the surface of the paper (e.g., using flexographic printing to apply an "ink" containing an activator to paper, using a traditional printing device such as a laser printer or inkjet printer to apply the "ink", or using a printing press or stencil to selectively apply an activator to one or more regions of a piece of paper). In other embodiments, the substrates may, instead of paper, be cloth/fabric, plastic, or other substances.

Where the path 101 intersects with untreated substrate 102, the leuco dye may remain in its uncolored state and is invisible or has a colorless translucency. Where the path 101 crosses treated substrate 103, the activator on or in the surface of the treated substrate 103 may cause the leuco dye to become a visible color.

The activator used in the treatment of the substrate to activate the leuco dye may include a color developer tailored to a particular leuco dye, and may be, in a preferred embodiment, a zincated resin. In some embodiments, the zincated resin may be mixed with water to form an aqueous solution that is printed onto the substrate, into which the substrate is dipped, with which the substrate is coated, or which is incorporated into the substrate itself as an ingredient. In other embodiments, the zincated resin may be mixed with denatured ethanol and/or propylene glycol for a non-water-based ink that may be better suited for application to the surface of a given substrate or via a given method, such as printing, stenciling, application with a marker, etc. Use of a solvent other than water may improve the quality of the reaction and result in a more robust color than the muted colors produced by a water-based activator.

Figure 2:
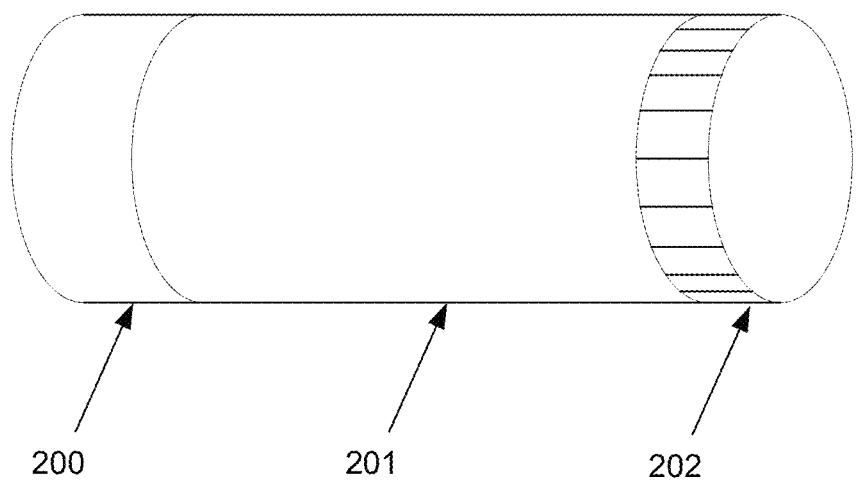
FIG. 2 illustrates, in simplified form, an embodiment of a leuco dye pastel marking device suitable for use with a substrate as illustrated in FIG. 1.

FIG. 2 illustrates, in simplified form, an embodiment of a leuco dye pastel marking device suitable for use with a substrate as illustrated in FIG. 1.

As illustrated in FIG. 2, the leuco dye pastel marking device 100 may comprise a substantially solid, cylindrical quantity of leuco dye/solvent mixture 200 stored in a cylindrical applicator body 201, similar to an applicator for a lipstick tube or lip balm. The applicator body 201 may have a base 202 at an end opposite the exposed mixture 200, so that either by twisting the base 202 or by pressing the base 202 inward, more of the mixture 200 will be exposed.

In some embodiments, the outer surface of the mixture 200 may harden if exposed to air for a period of time, forming a skin or patina that protects the inner portion of the mixture 200. As a consequence, the mixture 200 does not dry out or crumble if the marking device 100 is left uncapped. By pressing or rubbing the marking device against any surface for a moment, the patina may be broken and/or abraded away, revealing fresh mixture 200 underneath to apply to a substrate.

In some embodiments, the applicator body may, instead of a rigid plastic or metal cylinder, simply be a paper or other wrapping around the mixture 200, as with a traditional pastel or crayon. Instead of pressing or twisting base 202, the paper or other wrapping may be torn away to reveal more of the mixture 200. Similarly, the mixture 200 may be encased in a wooden or other casing that is shaved or ground away, as with a colored pencil lead. In some embodiments, the mixture 200 may be sufficiently rigid and cohesive that it may simply exist freely as a pressed cylinder without needing the support of and containment by a rigid body.

Finally, in some embodiments, the pastel may be pressed or shaped into a form other than a cylinder, such as a stick with a rectangular cross section, or even a stamp having an arbitrary shape such as a letter, number, or logo. In some embodiments, a specialized pastel marking device may be used to mark a pre-treated surface with one of these arbitrary insignia while being impossible to stain anything else through accidental misuse of the pastel marking device/stamp.

The mixture 200 may comprise, in some embodiments, an ester solvent with which a leuco dye is mixed in order to store the leuco dye without a need for encapsulation. In a preferred embodiment, the ester may be dimethyl adipate. A thickener (in an example embodiment, ethyl cellulose) may be added to improve the consistency of the mixture.

In a preferred embodiment, a pastel mixture may comprise about 68-75% dimethyl adipate, up to about 25% dibenzylamide sorbitol, about 1-2% dibutyl ethyl hexanoyl glutamide, about 1-2% ethyl cellulose, about 0.1-0.5% pentaerythritol tetrakis(3-(3,5-di-tert-butyl-4-hydroxyphenyl) proprionate), and up to about 6% leuco dye. The percentage of leuco dye may vary based on the brilliancy of a particular dye, the saturation of color desired, or chemical properties related to the dye's interaction with the inert ingredients of the mixture or that affect how easily the activator comes into contact with the dye. The formula of this preferred embodiment produces a more gel-like, semisolid pastel.

The hardness or softness of the mixture 200 may be calibrated according to the intended radius of the cylinder and the distance the mixture is intended to extend beyond the edge of the applicator body 201, so that the exposed region of the mixture will be strong enough to be rubbed against a surface without breaking off from the applicator body 201.

In embodiments where a harder pastel mixture is needed or desired, a portion of the ester may be replaced with 12 hydroxystearic acid or another fatty acid to form a more rigid pastel. For example, in one preferred embodiment, a harder pastel mixture may comprise about 48-55% 12 hydroxystearic acid, about 40-45% dimethyl adipate, about 4-8% ethyl cellulose, and up to about 6% leuco dye. In another preferred embodiment, a harder pastel mixture may comprise about 50-70% 12 hydroxystearic acid, about 20-40% dimethyl adipate, about 4-8% ethyl cellulose, and up to about 6% leuco dye. The formula of these preferred embodiments produce a much harder and substantially solid pastel.

In some embodiments, a pastel may include multiple different leuco dyes in order to achieve a particular color balance once activated. For example, a leuco dye pastel intended to become orange may include both a red leuco dye and a yellow leuco dye. Through the selection of different activators that react differently or to different extents with different dyes, a pastel could produce different colors when used to draw on different surfaces, such as emphasizing a redder orange on one page, but a yellower orange on another.

Figure 3:
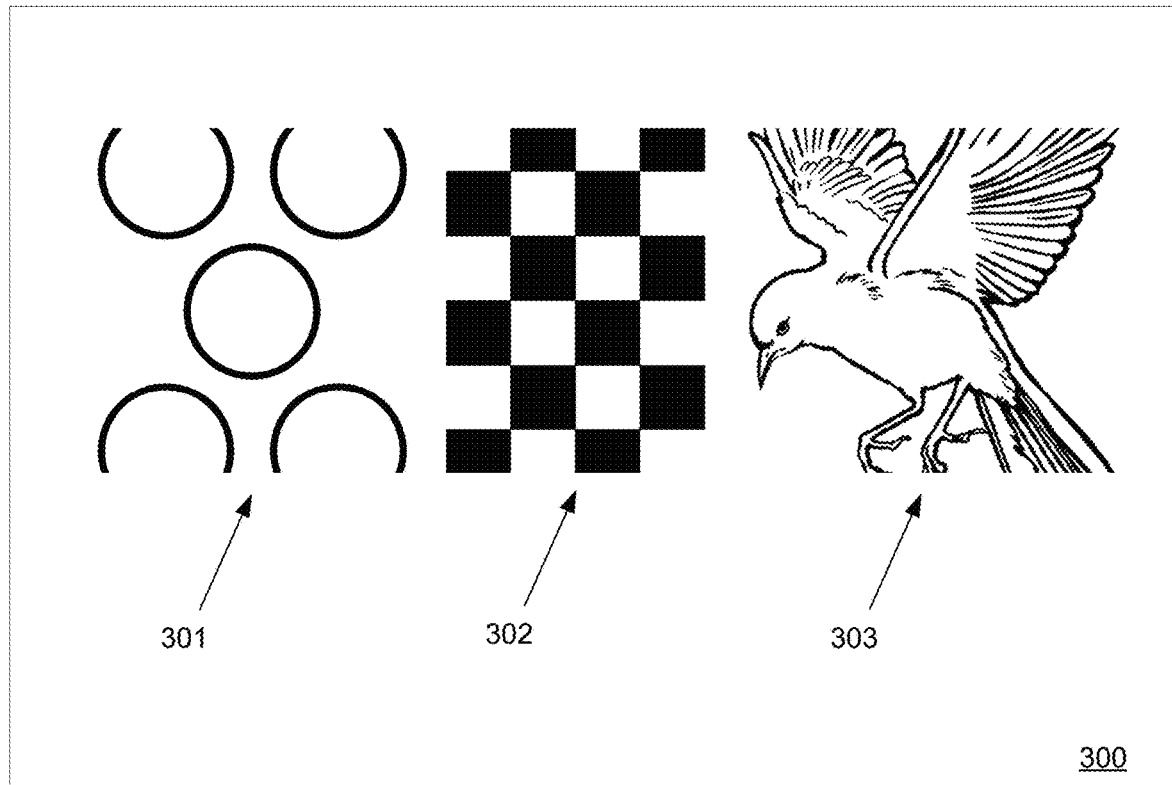
FIG. 3 illustrates, in simplified form, a pattern of activator in a substrate being revealed by application of a leuco dye pastel.

FIG. 3 illustrates, in simplified form, a pattern of activator in a substrate being revealed by application of a leuco dye pastel.

A substrate 300 may have activator printed upon it in one or more regions 301, 302, 303 etc., each with a different pattern, texturing, image, or message. As shown in FIG. 3, region 301 includes a first texture comprising a pattern of small circles drawn in activator, region 302 includes a second texture comprising a checkered pattern drawn in activator, and region 303 includes a picture of a bird. In a horizontal path where a leuco dye pastel marking device has passed (corresponding to path 101 of FIG. 1), the patterns and images are revealed, but the activator remains invisible outside the path, and even within the path, no coloration occurs where no activator has been printed. Designs or patterns may be printed with activator either in negative form, so that an image is revealed on the substrate 300 where the leuco dye fails to color the substrate, or in positive form, where the dye itself forms the intended image to be revealed by coloring.

In some embodiments, a children's activity book may use printed activator upon its pages as part of the activities. For example, a word search could have all the words encircled in invisible activator ink, so that a child could use a leuco dye pastel to either verify that a word is found or to mark randomly for a hint where to focus the search. A crossword puzzle, sudoku, maze, or other puzzle could have its solution printed on itself in activator, so that a player can make progress using a leuco dye pastel when the player is unable to determine a next step in the puzzle.

In some embodiments, a children's coloring set could be created that includes a number of leuco dye pastels, each of which is labeled as a "mystery" color. A child may thus make a game out of figuring out which pastel produces which color while coloring on a pre-treated coloring book, and be fascinated that a set of visually indistinguishable translucent pastels can make a number of different, vibrant colors. In other embodiments, the pastels may each be denoted with the color that will be produced if the leuco dye within is applied to a substrate already treated with an activator.

The presently described leuco dye pastel marking devices are particularly advantageous in applications involving children's coloring books or artwork because they allow for a guaranteed "no-mess" coloring activity; even if a child might use a leuco dye pastel intended for use on a coloring book to instead draw on a wall, furniture, or other important surface, permanent discoloration may be prevented, and a suitable solvent such as soap may be used to clean away the leuco dye while it is still in a transparent or translucent state, not yet activated.

In some embodiments, cloth may be used as a substrate instead of paper. For example, fabric could be sold pretreated either dipped in activator or with a pattern of activator printed upon it, so that a leuco dye pastel can be used to draw on the fabric (or on, for example, a T-shirt or other clothing sewn from the fabric) and/or to reveal the printed pattern. A T-shirt could be "tie-dyed" in activator, or in different activators that develop different leuco dyes, so that drawing upon the T-shirt with one or more leuco dye pastels reveals a tie-dye pattern that is otherwise invisible.

Figure 4:
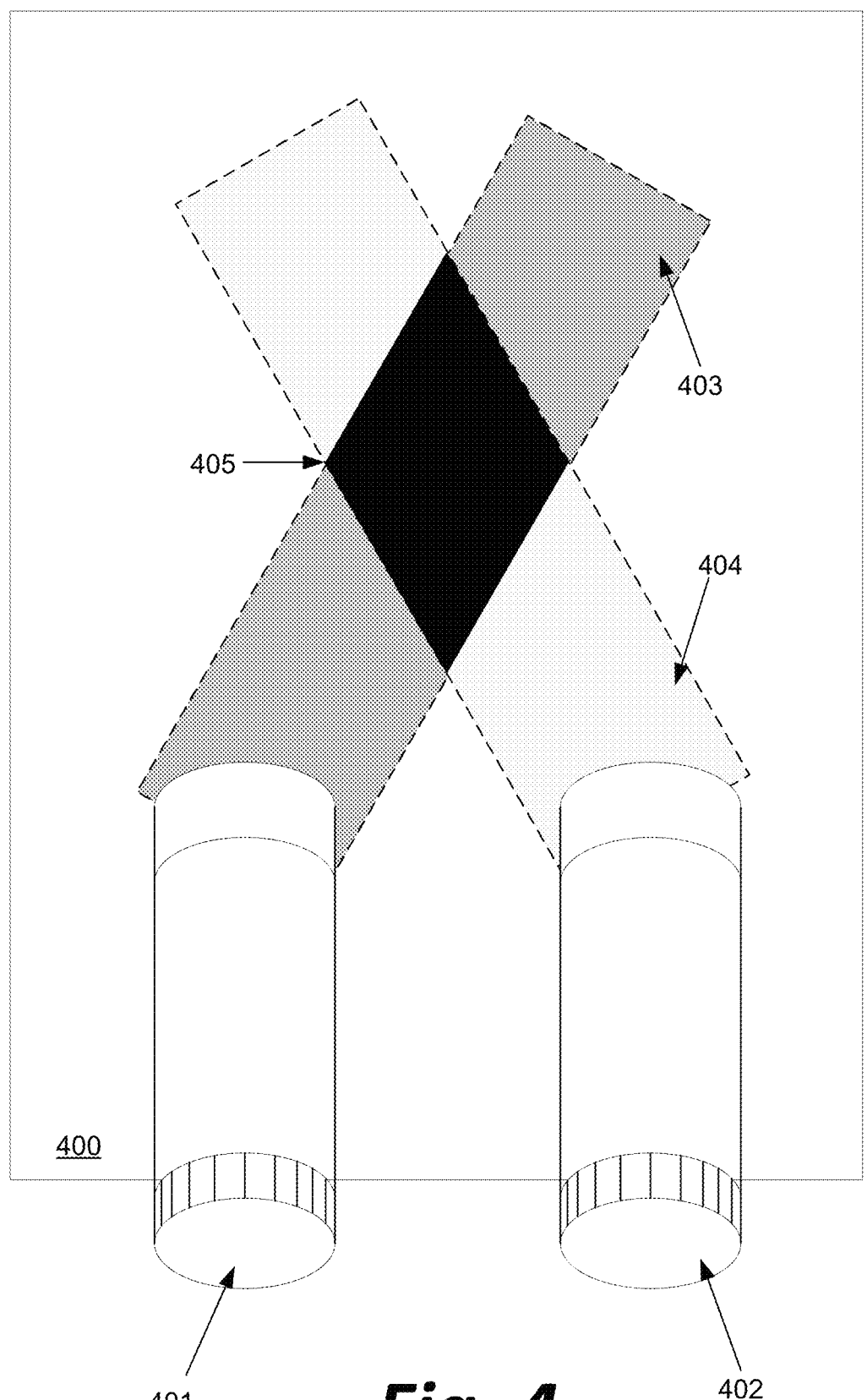
FIG. 4 illustrates, in simplified form, the use of multiple leuco dye pastel marking devices to color on a pretreated substrate.

FIG. 4 illustrates, in simplified form, the use of multiple leuco dye marking devices to color on a pretreated substrate.

As illustrated in FIG. 4, multiple leuco dye pastel marking devices 401 and 402 may be used on a same substrate 400 to produce different colorations in regions 403 and 404, respectively, and even to make a third colored region 405 resulting from the mix of the two leuco dyes when both are activated. If sufficient activator is impregnated in the substrate 400 or printed on the surface, different effects may be achievable for region 405 depending on qualities of the pastel marking devices 401 and 402 and how a user applies them to the substrate (such as, e.g., allowing all the dye from both to develop; allowing all the dye from the first pastel to develop, but only a faint influence from the second pastel; allowing the dye of a second pastel to develop only if the second pastel uses a harder formulation that scrapes through a softer pastel mixture left by the first pastel marking device, etc.).

In contrast, in some embodiments, less activator may be used on the substrate to deliberately ensure that only a first use of a pastel is activated, and subsequent uses will be ineffective.

What is claimed is:

1. A coloring kit comprising:
a substrate comprising an activator of one or more leuco dyes printed or coated on at least part of a surface of the substrate with the activator in a solvent mixture; and
one or more solid pastels comprising the one or more leuco dyes dissolved in a mixture that comprises either:
a mixture of about 68-75% dimethyl adipate, about 0-25% dibenzylamide sorbitol, about 1-2% dibutyl ethyl hexanoyl glutamide, about 1-2% ethyl cellulose, about 0.1-0.5% pentaerythritol tetrakis(3-(3,5-di-tert-butyl-4-hydroxyphenyl)proprionate), and about 6% or less leuco dye, or
a mixture of about 48-70% 12 hydroxystearic acid, about 20-45% dimethyl adipate, about 4-8% ethyl cellulose, and about 6% or less leuco dye.

2. The coloring kit of claim 1, wherein the activator is a zincated resin dissolved in a solvent other than water, and wherein the activator is printed selectively on the surface of the substrate to form a texture, image, or message that is revealed in response to application of one of the one or more solid pastels.

3. The coloring kit of claim 1, wherein the activator is printed or coated on all of a surface of the substrate.

4. A coloring kit comprising:
a substrate comprising an activator of one or more leuco dyes printed or coated on at least part of a surface of the substrate with the activator in a solvent mixture; and
one or more solid pastels comprising a mixture of an ester solvent and the one or more leuco dyes.

5. The coloring kit of claim 4, wherein the activator comprises a zincated resin.

6. The coloring kit of claim 4, wherein the ester is dimethyl adipate.

7. The coloring kit of claim 6, wherein the one or more solid pastels further comprise ethyl cellulose.

8. The coloring kit of claim 6, wherein the one or more solid pastels comprise a mixture of about 68-75% dimethyl adipate, about 0-25% dibenzylamide sorbitol, about 1-2% dibutyl ethyl hexanoyl glutamide, about 1-2% ethyl cellulose, about 0.1-0.5% pentaerythritol tetrakis(3-(3,5-di-tert-butyl-4-hydroxyphenyl)proprionate), and about 6% or less leuco dye.

9. The coloring kit of claim 7, wherein the one or more solid pastels further comprise 12 hydroxystearic acid.

10. The coloring kit of claim 9, wherein the one or more solid pastels comprise a mixture of about 50-70% 12 hydroxystearic acid, about 20-40% dimethyl adipate, about 4-8% ethyl cellulose, and about 6% or less leuco dye.

11. The coloring kit of claim 9, wherein the one or more solid pastels comprise a mixture of about 48-55% 12 hydroxystearic acid, about 40-45% dimethyl adipate, about 4-8% ethyl cellulose, and about 6% or less leuco dye.

12. The coloring kit of claim 4, wherein the activator is printed upon the substrate with a texture that is invisible, and wherein application of a solid pastel comprising the mixture reveals the texture.

13. The coloring kit of claim 4, wherein the substrate comprises a hidden message printed in activator.

14. The coloring kit of claim 4, further comprising more than one substrate, and wherein a first substrate of the coloring kit is printed with activator in a first pattern and a second substrate of the coloring kit is printed with activator in a second pattern different from the first pattern.

15. The coloring kit of claim 4, wherein the activator is printed or coated on all of a surface of the substrate.

* * * * *